United States Patent
Park

(10) Patent No.: US 11,988,273 B2
(45) Date of Patent: May 21, 2024

(54) AUTOMATIC OPENING AND CLOSING DEVICE FOR A VEHICLE LUBRICATION FLOW PASSAGE

(71) Applicants: HYUNDAI MOTOR COMPANY, Seoul (KR); KIA CORPORATION, Seoul (KR)

(72) Inventor: Myoung Soo Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 76 days.

(21) Appl. No.: 17/981,202

(22) Filed: Nov. 4, 2022

(65) Prior Publication Data
US 2023/0417315 A1 Dec. 28, 2023

(30) Foreign Application Priority Data
Jun. 24, 2022 (KR) .................. 10-2022-0077353

(51) Int. Cl.
*F16H 57/04* (2010.01)
*F16K 31/44* (2006.01)

(52) U.S. Cl.
CPC ......... *F16H 57/0443* (2013.01); *F16K 31/44* (2013.01)

(58) Field of Classification Search
CPC .................. F16H 57/0443; F16H 57/0424
See application file for complete search history.

(56) References Cited

U.S. PATENT DOCUMENTS

| | | | | |
|---|---|---|---|---|
| 2,135,746 A | * | 11/1938 | Curtis | F16N 7/34 184/55.2 |
| 2,695,075 A | * | 11/1954 | Clure | F16K 5/22 184/38.3 |
| 2,911,008 A | * | 11/1959 | Du Bois | G05D 23/185 137/625.46 |
| 5,725,073 A | * | 3/1998 | Zhou | F16N 7/34 239/317 |
| 5,937,970 A | * | 8/1999 | Wates | F16N 7/34 73/861.53 |
| 2023/0417315 A1 | * | 12/2023 | Park | F16K 31/44 |

FOREIGN PATENT DOCUMENTS

JP 2015218665 A * 12/2015

* cited by examiner

*Primary Examiner* — Michael A Riegelman
(74) *Attorney, Agent, or Firm* — Lempia Summerfield Katz LLC

(57) ABSTRACT

An automatic opening and closing device for a vehicle lubrication flow passage includes a valve housing installed on one side of an oil pump of the vehicle and includes a valve positioned in the valve housing and installed in a lubrication flow passage of the oil pump that passes through the inside of the valve housing. The valve is operated to open and close the lubrication flow passage by rotation. The device also has a mass member installed on one end of the valve to surround a rotation axis of the valve. The mass member is rotated by an inertial force generated during a turn or acceleration/deceleration of the vehicle to rotate the valve.

10 Claims, 16 Drawing Sheets

AUTOMATIC OPENING AND CLOSING DEVICE FOR A VEHICLE LUBRICATION FLOW PASSAGE

CROSS-REFERENCE TO RELATED APPLICATION

This application claims priority to and the benefit of Korean Patent Application No. 10-2022-0077353 filed in the Korean Intellectual Property Office on Jun. 24, 2022, the entire contents of which are incorporated herein by reference.

BACKGROUND OF THE DISCLOSURE

(a) Technical Field

The present disclosure relates to an automatic opening and closing device for a lubrication flow passage of a vehicle, and more particularly, to an automatic opening and closing device for a lubrication flow passage that may be automatically opened and closed by an inertial force during a turn or acceleration/deceleration of a vehicle.

(b) Description of the Related Art

A lubrication valve control system of a vehicle may be applied and used to efficiently lubricate and cool the clutch or gear train of a transmission or reducer. A lubrication valve control system to which an existing oil pump system is applied may use a solenoid valve to control the amount and flow path of oil introduced into the transmission or reducer.

However, such an existing lubrication valve control system using the solenoid valve may be disadvantageous in terms of cost, and thus has not been actively used in the reducer or the transmission.

The above information disclosed in this Background section is only to enhance understanding of the background of the disclosure. Therefore, the Background section may contain information that does not form the prior art that is already known in this country to a person of ordinary skill in the art.

SUMMARY OF THE DISCLOSURE

Thus, in view of the foregoing it is desirable to develop a mechanical valve control device that opens and closes a valve for the lubrication of the transmission or reducer by using a change in acceleration without any separate actuator.

An embodiment of the present disclosure provides a mechanical automatic opening and closing device for a lubrication flow passage of a vehicle. The mechanical device may open and close a valve for lubrication of a transmission and a reducer by using a change in acceleration during a vehicle turn or acceleration/deceleration.

According to an embodiment of the present disclosure, an automatic opening and closing device for a lubrication flow passage may include: a valve housing installed on one side of an oil pump of the vehicle; a valve positioned in the valve housing, installed in a lubrication flow passage of the oil pump that passes through an inside of the valve housing, and operated to open and close the lubrication flow passage by rotation; and a mass member installed on one end of the valve to surround a rotation axis of the valve, and rotated by an inertial force generated during a turn or acceleration/deceleration of the vehicle to rotate the valve.

A lubrication opening may pass through another end of the valve to communicate with the lubrication flow passage by the rotation of the valve.

The mass member may surround a portion of the rotation axis of the valve along a circumferential direction of the rotation axis.

A rotation space of the mass member may be provided in the valve housing The rotation space may limit a rotation range of the mass member for the lubrication opening to communicate with the lubrication flow passage or block the lubrication flow passage, when the mass member is rotated.

The lubrication opening may include a pair of lubrication openings. The pair of lubrication openings may be spaced apart from each other in an axial direction of the valve. The pair of lubrication openings may be open in directions perpendicular to each other.

The pair of lubrication openings may have diameters different from each other.

The rotation space may have a left-right symmetrical shape with respect to the rotation axis of the valve.

An elastic member may be mounted on a circumference of the rotation axis of the valve. The elastic member may apply an elastic force to the mass member for the mass member to be centered in the rotation space.

The mass member may be suspended under the rotation axis of the valve in a direction of gravity.

The lubrication flow passage may communicate with the inlet or outlet of an electric oil pump (EOP).

According to an embodiment of the present disclosure, it is possible to automatically open and close the lubrication valve based on a turn or acceleration/deceleration of the vehicle to supply oil to a portion of the transmission or reducer having poor lubrication. The lubrication performance and durability of the transmission or reducer is thereby improved.

It is also possible to distribute the oil supply amount supplied to the transmission or reducer based on the turn or acceleration/deceleration of a vehicle, thereby improving the oil transfer efficiency.

It is also possible to reduce the cost by applying the mechanical valve control system without any separate device.

DETAILED DESCRIPTION OF THE EMBODIMENTS

Figure 1:
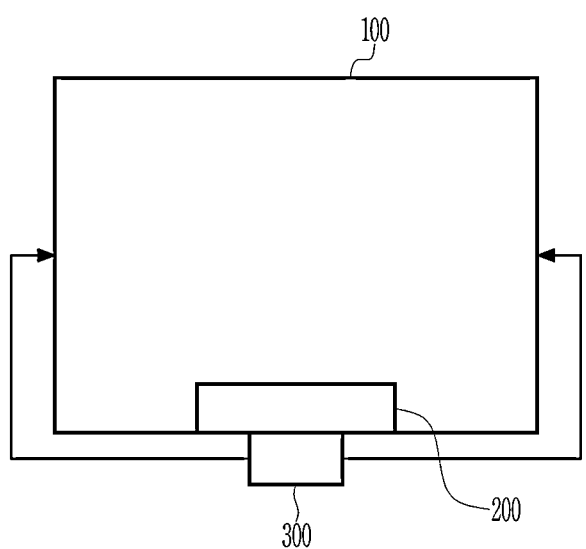
FIG. 1 is a view showing a state where an automatic opening and closing device for a vehicle lubrication flow passage is installed on one side of an oil pump according to an embodiment of the present disclosure.

Hereinafter, embodiments of the present disclosure are described in detail with reference to the accompanying drawings so that those of ordinary skill in the art to which the present disclosure pertains may easily practice the technical concepts of the present disclosure.

The present disclosure may be modified in various different forms and is not limited to embodiments provided in the specification.

In addition, in several embodiments, components having the same configuration are representatively described using the same reference numerals, and only components different from those of an already described embodiment are described in the other embodiments.

It should be understood that the drawings are schematic and not drawn to scale. The size and proportion of a component in the drawings may be shown relatively exaggerated or reduced in size in order to clearly and easily explain the drawings. This arbitrary size is only illustrative and not limitative. In addition, the same reference numeral is used to denote a similar feature of the same structure, element or part shown in two or more drawings. When it is described that an element is referred to as being "on" or "above" another element, it is to be understood that the element may be directly "on" another element or "above" another element including a third element interposed therebetween.

An embodiment of the present disclosure may specifically describe one embodiment or example of the present disclosure. As a result, the diagrams illustrated herein may be variously modified. Accordingly, an embodiment is not limited to a specific shape of the illustrated portion, and may include, for example, a modified shape when produced.

Hereinafter, a structure of an automatic opening and closing device for a lubrication flow passage of a vehicle according to an embodiment of the present disclosure is described in detail with reference to the accompanying drawings.

Figure 2:
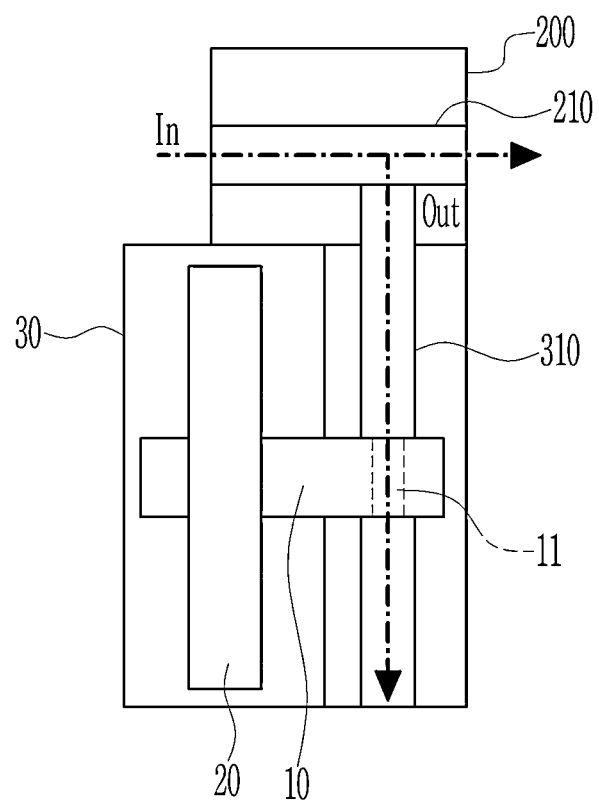
FIG. 2 is a view showing the automatic opening and closing device for a vehicle lubrication flow passage according to an embodiment of the present disclosure.

FIG. 1 is a view showing a state where an automatic opening and closing device for a lubrication flow passage of a vehicle is installed on one side of an oil pump according to an embodiment of the present disclosure. FIG. 2 is a view showing the automatic opening and closing device for a vehicle's lubrication flow passage according to an embodiment of the present disclosure.

Referring to FIG. 1, an automatic opening and closing device 300 for a lubrication flow passage for a vehicle according to an embodiment of the present disclosure may be installed on one side of an oil pump 200 for supplying lubricant (or oil) to a transmission or reducer 100 and used to change an oil supply path of the oil pump 200.

The automatic opening and closing device 300 for the lubrication flow passage may include a valve housing 30 installed on one side of the oil pump 200, a valve 10 positioned in the valve housing 30, and a mass member 20 installed on one end of the valve 10 to surround a rotation axis 22 of the valve 10.

In addition to an existing lubrication flow passage 210 of the oil pump 200, a lubrication flow passage 310, through which oil is introduced from the oil pump 200 when the valve 10 is opened, may pass through the inside of the valve housing 30. The cylindrical valve 10 may be installed in the lubrication flow passage 310 inside the valve housing 30. The lubrication flow passage 310 may thus be opened and closed by rotation of the valve 10.

The mass member 20 may be installed on one end, i.e., a first end of the valve 10 to surround a rotation axis of the valve 10. A lubrication opening 11 may be positioned in the other end, i.e., a second end of the valve 10 to communicate with the lubrication flow passage 310 by the rotation of the valve 10. The lubrication opening 11 may be open in a direction perpendicular to the rotation axis 22 of the valve 10. Oil may be introduced into the lubrication opening 11 through the lubrication flow passage 310 when the valve 10 is rotated and the lubrication opening 11 thus coincides and communicates with the lubrication flow passage 310.

The mass member 20 may be installed on one end of the valve 10 to surround the rotation axis 22 of the valve 10 and may be rotated by an inertial force generated during the acceleration/deceleration of the vehicle or as the vehicle is turning to rotate the valve 10.

The mass member 20 may surround a portion of the rotation axis 22 of the valve 10 along a circumferential direction of the rotation axis 22.

In addition, a rotation space 32 of the mass member 20 may be provided in the valve housing 30. The rotation space 32 may limit a rotation range of the mass member 20 when the mass member 20 is rotated. In other words, the rotation space 32 may limit the range for the lubrication opening 11 to communicate with the lubrication flow passage 310 or may block the lubrication flow passage 310, when the mass member 20 is rotated.

Figure 3:
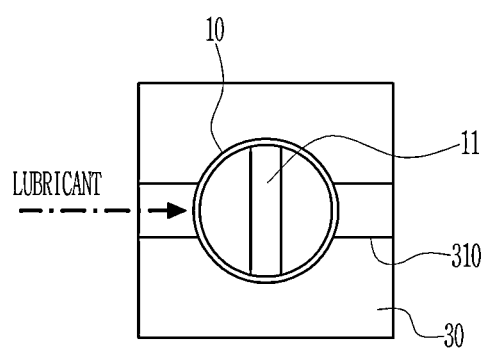
FIG. 3 is a view showing states of a valve and a mass member of the automatic opening and closing device for the lubrication flow passage during flatland travel of the vehicle according to an embodiment of the present disclosure.
Figure 3:
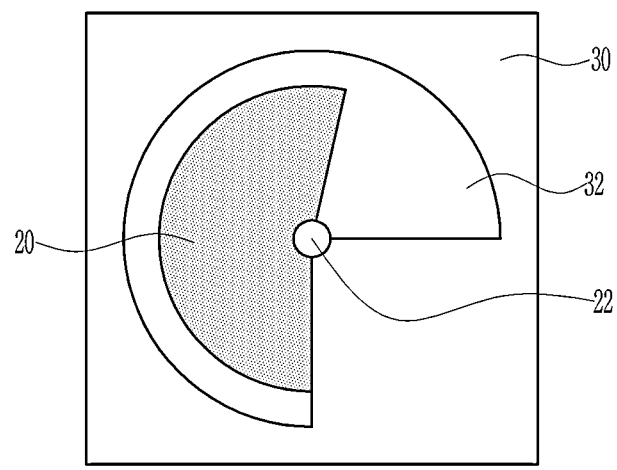

FIG. 3 is a view showing states of the valve and the mass member of the automatic opening and closing device for the lubrication flow passage during flatland travel of the vehicle according to an embodiment of the present disclosure.

As shown in FIG. 3, the mass member 20 may be moved toward one side in the valve housing 30 during the flatland travel. In other words, when no inertial force is applied to the vehicle, the lubrication opening 11 of the valve may be positioned in a direction approximately perpendicular to the lubrication flow passage 310, such that the valve 10 may block the lubrication flow passage 310. Oil may not be introduced through the lubrication flow passage 310 in a state where the lubrication opening 11 does not communicate with the lubrication flow passage 310, and the valve thus blocks the lubrication flow passage 310. In other words, oil supplied from the oil pump 200 may here flow only through the existing lubrication flow passage 210.

Figure 4:
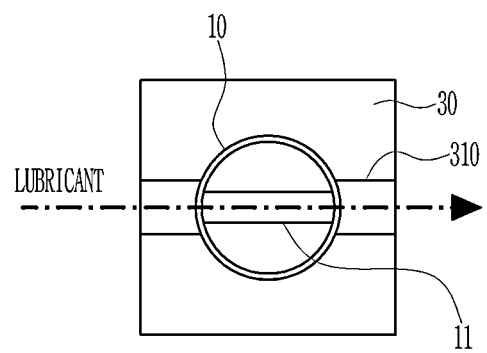
FIG. 4 is a view showing states of the valve and the mass member of the automatic opening and closing device for the lubrication flow passage during a turn or acceleration/deceleration of the vehicle according to an embodiment of the present disclosure.
Figure 4:
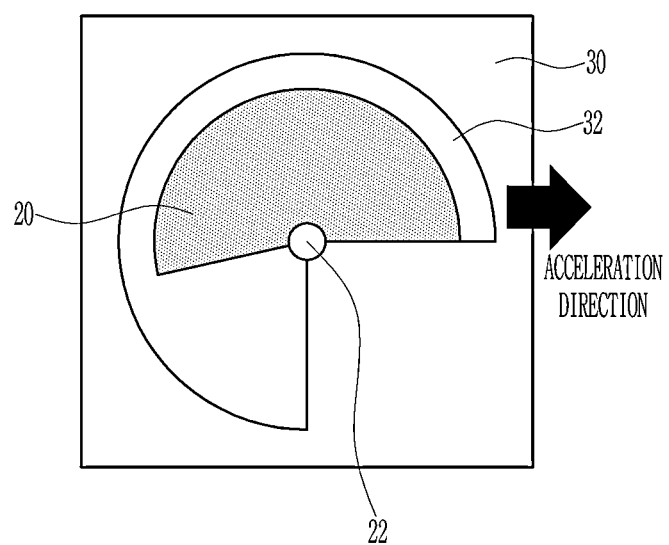

FIG. 4 is a view showing states of the valve and the mass member of the automatic opening and closing device for the lubrication flow passage while the vehicle turns or is under acceleration/deceleration according to an embodiment of the present disclosure.

As shown in FIG. 4, the mass member 20 may be rotated about the rotation axis 22 of the valve 10 in an inertial force direction (or acceleration direction) during a turning or acceleration/deceleration. In other words, when the inertial force is applied to the vehicle, the valve 10 connected to the mass member 20 may also be rotated.

The lubrication opening 11 of the valve 10 may communicate with the lubrication flow passage 310 by the rotation of the valve 10 and oil supplied from the oil pump 200 may be introduced through the lubrication flow passage 310.

Accordingly, as shown in FIGS. 3 and 4, the valve 10 may be rotated by the inertial force applied to the vehicle and oil supplied from the oil pump 200 may thus flow through the lubrication flow passage 310 formed in the valve housing 30 as well as the existing lubrication flow passage 210.

Figure 5:
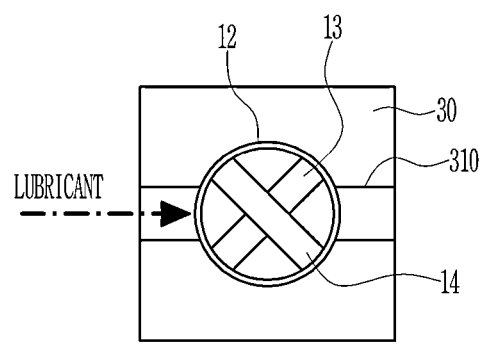
FIG. 5 is a view showing states of a valve and a mass member of the automatic opening and closing device for the lubrication flow passage during flatland travel of the vehicle according to another embodiment of the present disclosure.
Figure 5:
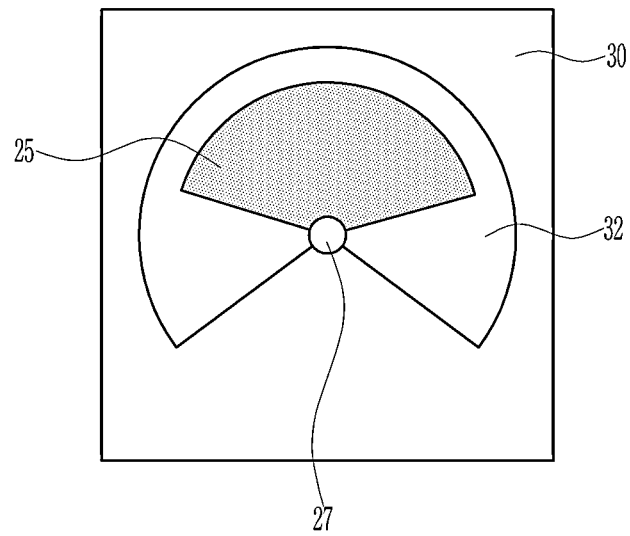

FIG. 5 is a view showing states of a valve and a mass member of the automatic opening and closing device for the lubrication flow passage during flatland travel of the vehicle according to another embodiment of the present disclosure.

As shown in FIG. 5, a pair of lubrication openings 13 and 14 may be spaced apart from each other in an axial direction of a valve 12. The two lubrication openings 13 and 14 may pass through an axis of the valve 12 in directions that are perpendicular to each other.

In addition, the rotation space 32 of the valve housing 30 may have a left-right symmetrical shape with respect to a rotation axis 27 of the valve 12. A mass member 25 corresponding thereto may have a left-right symmetrical shape with respect to the rotation axis 27 of the valve 12.

The mass member 25 may be centered in the rotational space 32 during the vehicle's flatland travel, i.e., when no inertial force is applied to the vehicle. To this end, an elastic member (not shown) may be mounted on a circumference of the rotation axis 27 of the valve 12. The elastic member may apply an elastic force to the mass member 25 for the mass member 25 to be centered in the rotation space 32. The elastic member may be a spring wound around the rotation axis 27 of the valve 12.

The pair of lubrication openings 13 and 14 of the valve 12 may not communicate with the lubrication flow passage 310 to block the lubrication flow passage 310 during flatland travel. Oil supplied from the oil pump 200 may not be introduced through the lubrication flow passage 310 and thus may flow only through the existing lubrication flow passage 210.

Figure 6:
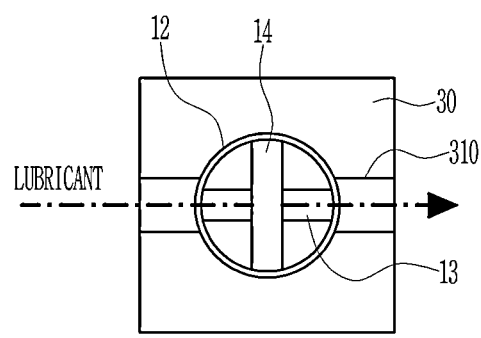
FIG. 6 is a view showing states of the valve and the mass member of the automatic opening and closing device for the lubrication flow passage during a left turn or acceleration/deceleration of the vehicle according to another example of the present disclosure.
Figure 6:
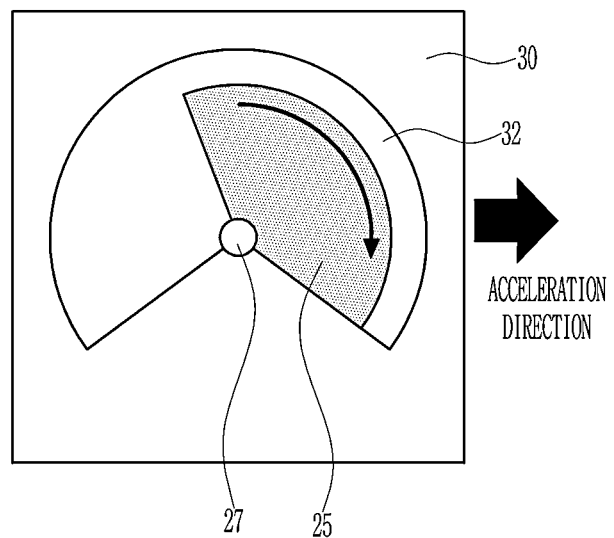
Figure 7:
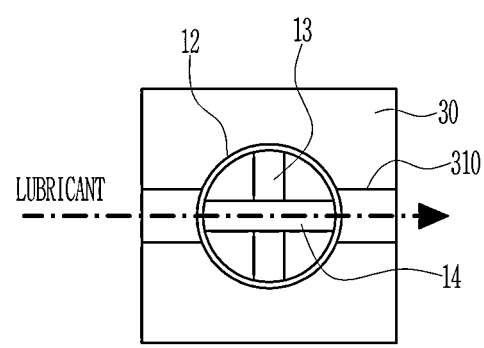
FIG. 7 is a view showing states of the valve and the mass member of the automatic opening and closing device for the lubrication flow passage during a right turn or acceleration/deceleration of the vehicle according to another example of the present disclosure.
Figure 7:
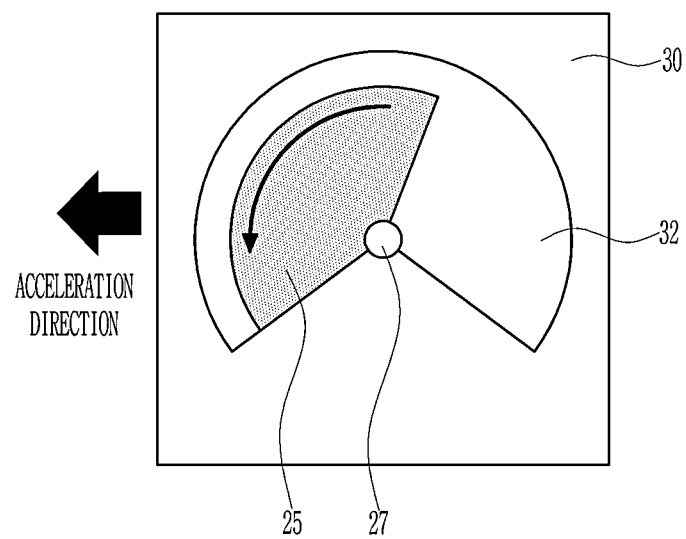

FIG. 6 is a view showing states of the valve and the mass member of the automatic opening and closing device for the lubrication flow passage during a left turn or acceleration/deceleration of the vehicle according to another example of the present disclosure. FIG. 7 is a view showing states of the valve and the mass member of the automatic opening and closing device for the lubrication flow passage during a right turn or acceleration/deceleration of the vehicle according to another example of the present disclosure.

As shown in FIG. 6, the pair of lubrication openings 13 and 14 may be spaced apart from each other in the axial direction of the valve 12. Again, the two lubrication openings 13 and 14 may be open in directions that are perpendicular to each other.

The mass member 25 may be rotated to the right about the rotation axis 27 of the valve 12 when the inertial force is applied to the vehicle to the right during the vehicle's left turn or acceleration/deceleration and the valve 12 connected to the mass member 25 may also be rotated.

The valve 12 may be rotated so that the lubrication flow passage 310 communicates with one of the pair of lubrication openings (or first lubrication opening 13). Oil supplied from the oil pump 200 may be introduced into the lubrication flow passage 310 through the first lubrication opening 13.

As shown in FIG. 7, when the inertial force is applied to the vehicle to the left during the right turn or acceleration/deceleration of the vehicle, the mass member 25 may be rotated to the left about the rotation axis 27 of the valve 12. The valve 12 connected to the mass member 25 may also be rotated.

The valve 12 may be rotated so that the lubrication flow passage 310 communicates with the other of the pair of lubrication openings (or second lubrication opening 14). Oil supplied from the oil pump 200 may be introduced into the lubrication flow passage through the second lubrication opening 14.

As such, the usage of the two-way valve may enable the communication and forced lubrication of the lubrication flow passage 310 by the inertial force generated in two directions during the left and right turns or acceleration/deceleration of the vehicle.

Figure 8:
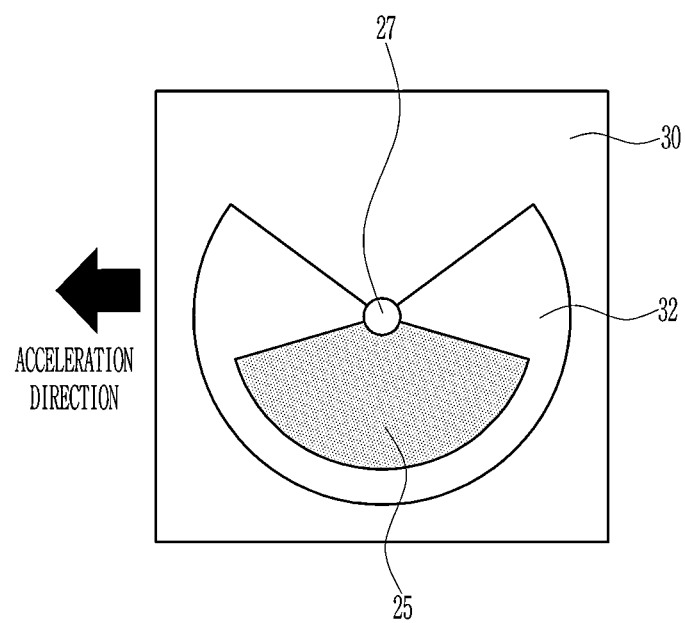
FIG. 8 is a view showing a state of a mass member of the automatic opening and closing device for the lubrication flow passage during flatland travel of a vehicle according to still another example of the present disclosure.

FIG. 8 is a view showing a state of a mass member of the automatic opening and closing device for the lubrication flow passage during flatland travel of the vehicle according to still another example of the present disclosure.

Hereinafter, the description provided related to FIGS. 8-10 uses the two-way valve 12 described with reference to FIGS. 5-7.

As shown in FIG. 8, the mass member 25 may be suspended under the rotation axis 27 of the valve 12 in a direction of gravity. In this case, the mass member 25 may be naturally centered in the rotation space 32 by the force of gravity when no inertial force is applied to the vehicle. There is thus no need to install the elastic member on the rotation axis 27 of the valve 12.

The mass member 25 may be centered in the rotation space 32 when no inertial force is applied to the vehicle. Thus, the lubrication opening 13 or 14 may not communicate with the lubrication flow passage 310 to block the lubrication flow passage 310. Then, oil supplied from the oil pump 200 may not be introduced through the lubrication flow passage 310 and thus may flow only through the existing lubrication flow passage 210.

Figure 9:
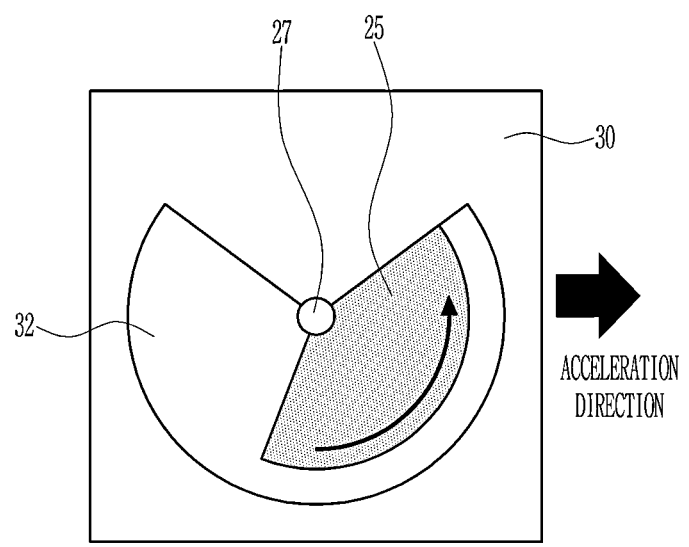
FIG. 9 is a view showing a position of the mass member of the automatic opening and closing device for the lubrication flow passage during the left turn or acceleration/deceleration of the vehicle according to still another example of the present disclosure.

FIG. 9 is a view showing a position of the mass member of the automatic opening and closing device for the lubrication flow passage during a left turn or acceleration/deceleration of the vehicle according to still another example of the present disclosure. FIG. 10 is a view showing a position of the mass member of the automatic opening and closing device for the lubrication flow passage during a right turn or acceleration/deceleration of the vehicle according to still another example of the present disclosure.

As shown in FIG. 9, when the inertial force is applied to the vehicle to the right during the left turn or acceleration/deceleration of the vehicle, the mass member 25 may be rotated to the right about the rotation axis 27 of the valve 12. The valve 12 connected to the mass member 25 may also be rotated and the lubrication flow passage 13 may be open and communicate with the lubrication opening 310 by the rotation of the valve 12.

Figure 10:
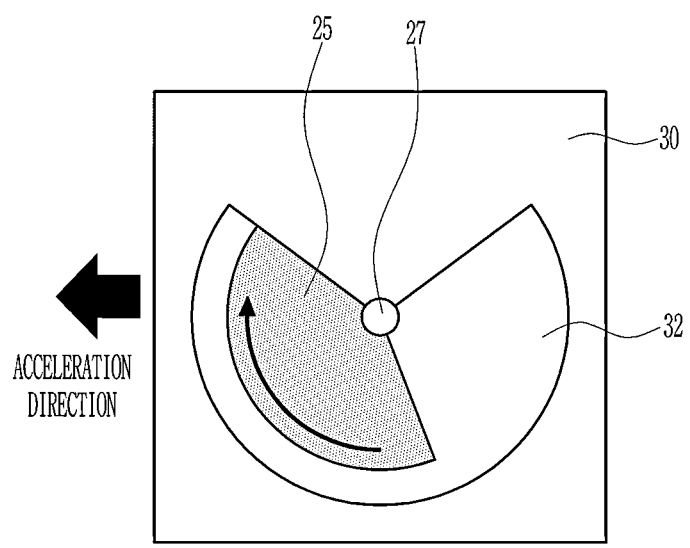
FIG. 10 is a view showing a position of the mass member of the automatic opening and closing device for the lubrication flow passage during the right turn or acceleration/deceleration of the vehicle according to still another example of the present disclosure.

In addition, as shown in FIG. 10, when the inertial force is applied to the vehicle to the left during the right turn or acceleration/deceleration of the vehicle, the mass member 25 may be rotated to the left about the rotation axis of the valve 12. The valve 12 connected to the mass member 25 may also be rotated and the lubrication flow passage 310 may be open and communicate with the lubrication opening 14 by the rotation of the valve 12.

Figure 11:
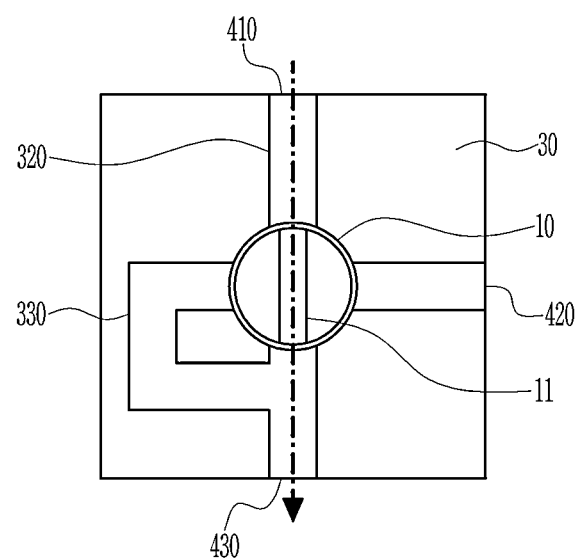
FIGS. 11 and 12 are views each showing a state where a flow passage communicating with an inlet of an electric oil pump (EOP) is changed by the automatic opening and closing device for a lubrication flow passage according to an embodiment of the present disclosure.
Figure 12:
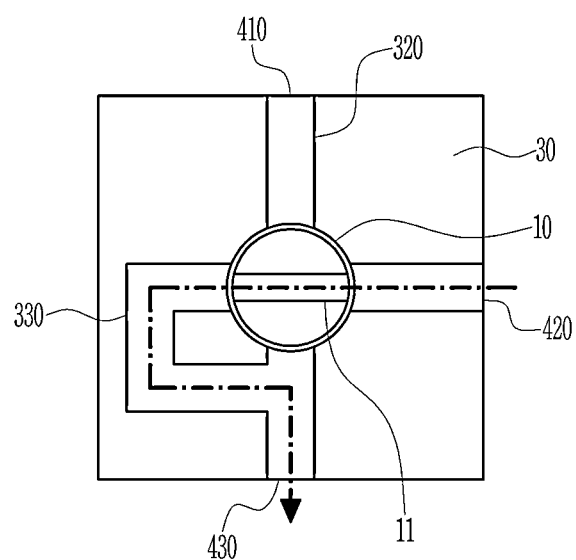

FIGS. 11 and 12 are views each showing a state where a flow passage communicating with an inlet of an electric oil pump (EOP) is changed by the automatic opening and closing device for a lubrication flow passage of a vehicle according to an embodiment of the present disclosure.

Hereinafter, the description provided related to FIGS. 11-16 uses the one-way valve 10 described with reference to FIGS. 3 and 4.

Two inlets of the electric oil pump may be installed in the transmission or reducer 100. A first lubrication flow passage 320 and a second lubrication flow passage 330 may respectively communicate with a first inlet 410 of the electric oil pump and a second inlet 420 of the electric oil pump.

The valve 10 may be positioned in the first lubrication flow passage 320 and the second lubrication flow passage 330. The lubrication opening of the valve 10 may communicate with the first lubrication flow passage 320 or the second lubrication flow passage 330 by the rotation of the valve 10.

As shown in FIG. 11, the valve 10 may be rotated so that the lubrication opening 11 communicates with the first lubrication flow passage 320 communicating with the first inlet 410 of the electric oil pump during flatland travel of the vehicle, i.e., when no inertial force is applied to the vehicle. As shown in FIG. 12, the valve 10 may be rotated so that the lubrication opening 11 communicates with the second lubrication flow passage 330 communicating with the second inlet 420 of the electric oil pump during turning or acceleration/deceleration of the vehicle, i.e., when the inertial force is applied to the vehicle.

As such, the valve 10 may be rotated by the inertial force applied to the vehicle to automatically select the inlet of the electric oil pump through which oil is sucked and thus change a flow path to the lubrication flow passage 320 or 330.

Figure 13:
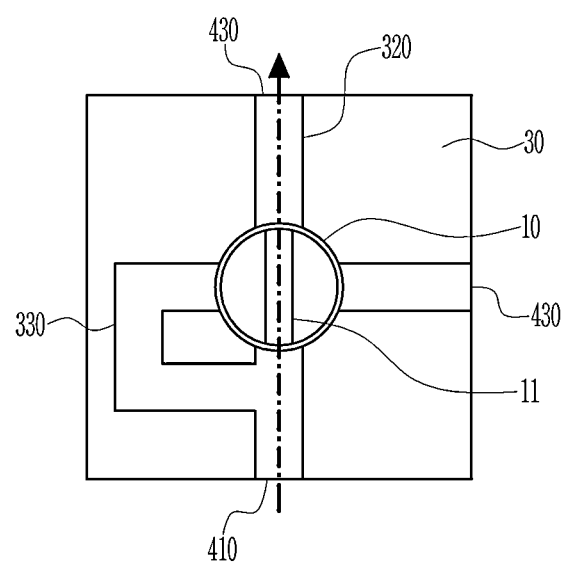
FIGS. 13 and 14 are views each showing a state where a flow passage communicating with an outlet of the electric oil pump is changed by the automatic opening and closing device for a lubrication flow passage according to an embodiment of the present disclosure.
Figure 14:
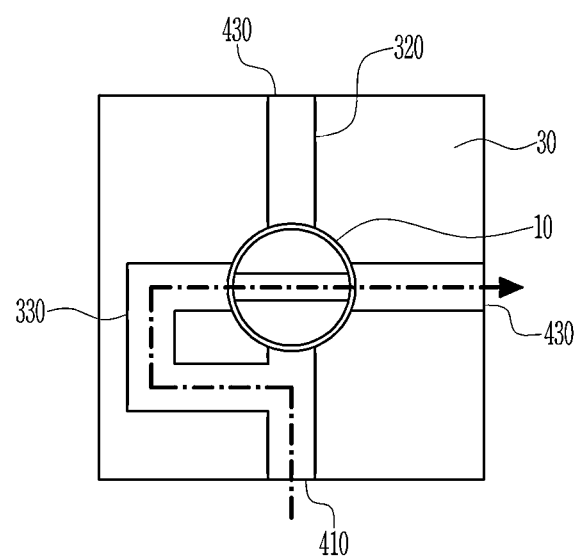

FIGS. 13 and 14 are views each showing a state where a flow passage communicating with an outlet of the electric oil pump is changed by the automatic opening and closing device for a lubrication flow passage of a vehicle according to an embodiment of the present disclosure.

As shown in FIGS. 13 and 14, one electric oil pump may be installed in the transmission or reducer 100 and the lubrication flow passage 320 or 330 communicating with an outlet 430 of the electric oil pump may be changed. In other words, the first lubrication flow passage 320 and the second lubrication flow passage 330 may communicate with the outlet 430 of the electric oil pump and the valve 10 may be positioned in the first lubrication flow passage 320 and the second lubrication flow passage 330. The lubrication opening 11 of the valve may communicate with the first lubrication flow passage 320 or the second lubrication flow passage 330 by the rotation of the valve 10.

As shown in FIG. 13, the valve 10 may be rotated so that the lubrication opening 11 communicates with the first lubrication flow passage 320 connected with the outlet 430 of the electric oil pump during flatland travel of the vehicle. As shown in FIG. 14, the valve 10 may be rotated so that the lubrication opening 11 communicates with the second lubrication flow passage 330 connected with the outlet 430 of the electric oil pump during turning or acceleration/deceleration of the vehicle.

As such, the valve 10 may be rotated by the inertial force applied to the vehicle to change the flow path to the lubrication flow passage 320 or 330 so that the lubrication opening 11 communicates with the lubrication flow passage 320 or 330 connected to the outlet 430 of the electric oil pump.

Figure 15:
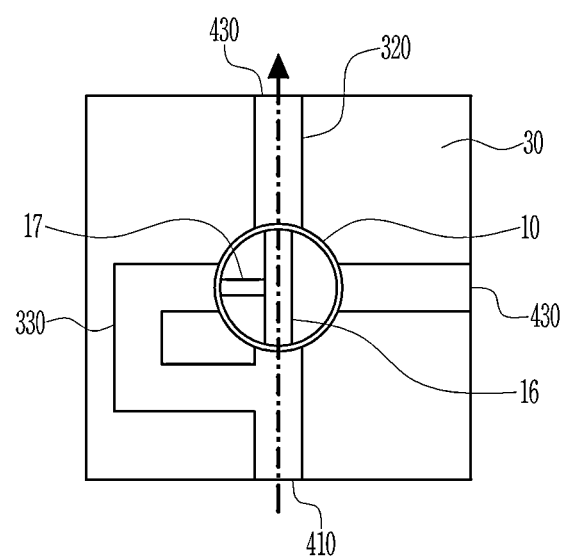
FIGS. 15 and 16 are views each showing a state where an oil discharge amount delivered to the flow passage communicating with the outlet of the electric oil pump is adjusted by the automatic opening and closing device for a lubrication flow passage according to an embodiment of the present disclosure.
Figure 16:
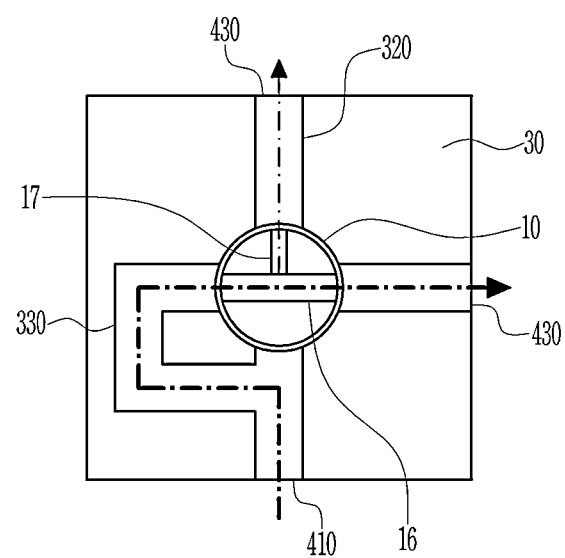

FIGS. 15 and 16 are views each showing a state where an oil discharge amount delivered to the flow passage communicating with the outlet of the electric oil pump is adjusted by the automatic opening and closing device for a lubrication flow passage of a vehicle according to an embodiment of the present disclosure.

As shown in FIGS. 15 and 16, one electric oil pump may be installed in the transmission or reducer 100 and the oil discharge amount delivered to the lubrication flow passage 320 or 330 communicating with the outlet 430 of the electric oil pump may be changed. In other words, the first lubrication flow passage 320 and the second lubrication flow passage 330 may communicate with the outlet 430 of the electric oil pump and the valve 10 may be positioned in the first lubrication flow passage 320 and the second lubrication flow passage 330.

A pair of lubrication openings, i.e., a third lubrication opening 16 and a fourth lubrication opening 17, may be positioned in the valve 10 to pass through the axis of the valve 10 in directions perpendicular to each other while being spaced apart from each other in an axial direction of the valve. The two lubrication openings 16 and 17 may have diameters that are different from each other. In addition, the first lubrication flow passage 16 and the second lubrication flow passage 17 may cross each other in the directions perpendicular to each other.

As shown in FIG. 15, the valve 10 may be rotated so that the third lubrication opening 16 communicates with the first lubrication flow passage 320 connected with the outlet 430 of the electric oil pump during flatland travel of the vehicle. Here, the fourth lubrication opening 17 may communicate with the second lubrication flow passage 330. The third lubrication opening 16 may have a diameter larger than the fourth lubrication opening 17. Thus, a larger or greater amount of oil may thus be discharged through the first lubrication flow passage 320 compared to the second lubrication flow passage 330.

In addition, as shown in FIG. 16, the valve 10 may be rotated so that the fourth lubrication opening 17 communicates with the first lubrication flow passage 320 connected with the outlet 430 of the electric oil pump during turning or acceleration/deceleration of the vehicle. Here, the third lubrication opening 16 may communicate with the second lubrication flow passage 330. In this case, a larger or greater amount of oil may be discharged through the second lubrication flow passage 330 compared to the first lubrication flow passage 320.

In this manner, according to an embodiment of the present disclosure, it is possible to automatically open and close the lubrication valve based on the turning or lateral acceleration/deceleration of the vehicle to supply oil to a poor lubrication portion, i.e., a poorly lubricated part, of the transmission or reducer. Lubrication performance and durability of the transmission or reducer is thereby improved.

It is also possible to distribute an oil supply amount supplied to the transmission or reducer based on the turning or lateral acceleration/deceleration of eh vehicle, thereby improving oil transfer efficiency.

It is also possible to reduce a cost by applying such a mechanical valve control system without any separate device.

While the technical concepts of this disclosure have been described in connection with what are presently considered to be practical embodiments, it is to be understood that the disclosure is not limited to the disclosed embodiments. On the contrary, this disclosure is intended to cover various modifications and equivalent arrangements included within the spirit and scope of the appended claims.

| <Description of symbols> | |
|---|---|
| 10, 12: valve | 11: lubrication opening |
| 13: first lubrication opening | 14: second lubrication opening |
| 16: third lubrication opening | 17: fourth lubrication opening |
| 20, 25: mass member | 22, 27: rotation axis |
| 30: valve housing | 32: rotation space |
| 100: transmission or reducer | 200: oil pump |
| 210, 310: lubrication flow passage | |
| 300: automatic opening and closing device for lubrication flow passage | |
| 320: first lubrication flow passage | |
| 330: second lubrication flow passage | |
| 410: first inlet of electric oil pump | |
| 420: second inlet of electric oil pump | |
| 430: outlet of electric oil pump | |

What is claimed is:

1. An automatic opening and closing device for a lubrication flow passage of a vehicle, the device comprising:
   a valve housing installed on one side of an oil pump of the vehicle;
   a valve positioned in the valve housing, installed in a lubrication flow passage of the oil pump that passes through an inside of the valve housing, and operated to open and close the lubrication flow passage by rotation; and
   a mass member installed on one end of the valve to surround a rotation axis of the valve, and rotated by an inertial force generated during a turn or acceleration/deceleration of the vehicle to rotate the valve.

2. The device of claim 1, wherein a lubrication opening passes through another end of the valve to communicate with the lubrication flow passage by the rotation of the valve.

3. The device of claim 2, wherein
   a rotation space of the mass member is provided in the valve housing, and
   the rotation space limits a rotation range of the mass member for the lubrication opening to communicate with the lubrication flow passage or block the lubrication flow passage, when the mass member is rotated.

4. The device of claim 3, wherein the rotation space has a left-right symmetrical shape with respect to the rotation axis of the valve.

5. The device of claim 4, wherein
   an elastic member is mounted on a circumference of the rotation axis of the valve, and
   the elastic member applies an elastic force to the mass member for the mass member to be centered in the rotation space.

6. The device of claim 4, wherein the mass member is suspended under the rotation axis of the valve in a direction of gravity.

7. The device of claim 2, wherein
   the lubrication opening comprises a pair of lubrication openings spaced apart from each other in an axial direction of the valve, and
   the pair of lubrication openings is open in directions perpendicular to each other.

8. The device of claim 7, wherein each opening of the pair of lubrication openings has a diameter different from the other.

9. The device of claim 1, wherein the mass member surrounds a portion of the rotation axis of the valve along a circumferential direction of the rotation axis.

10. The device of claim 1, wherein the lubrication flow passage communicates with an inlet or an outlet of an electric oil pump (EOP).

* * * * *